(12) United States Patent
Lee et al.

(10) Patent No.: US 9,101,971 B2
(45) Date of Patent: Aug. 11, 2015

(54) TAIL TRIM ASSEMBLY OF EXHAUST PIPE FOR VEHICLE AND METHOD OF MANUFACTURING THE SAME

(71) Applicants: Kia Motors Corporation, Seoul (KR); Hyundai Motor Company, Seoul (KR)

(72) Inventors: Wonsuk Lee, Goyang-si (KR); Jaewoo Park, Ansan-si (KR)

(73) Assignees: KIA MOTORS CORPORATION, Seoul (KR); HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/051,113

(22) Filed: Oct. 10, 2013

(65) Prior Publication Data
US 2014/0041225 A1    Feb. 13, 2014

Related U.S. Application Data

(62) Division of application No. 12/274,208, filed on Nov. 19, 2008, now abandoned.

(30) Foreign Application Priority Data

Apr. 29, 2008    (KR) .................. 10-2008-0039857

(51) Int. Cl.
  *B60K 13/04*    (2006.01)
  *B21D 26/033*    (2011.01)
  (Continued)

(52) U.S. Cl.
  CPC .............. *B21D 26/033* (2013.01); *B60K 13/04* (2013.01); *F01N 13/1861* (2013.01); *F01N 13/20* (2013.01); *Y10T 29/49398* (2015.01)

(58) Field of Classification Search
  CPC ......... B60K 13/04; F01N 13/18; F01N 13/20; F01N 13/1872; F01N 13/1883
  USPC ......... 180/89.2, 225, 296, 309; 181/226–228; D12/194
  See application file for complete search history.

(56) References Cited

U.S. PATENT DOCUMENTS

| 2,106,427 A | 1/1938 | Hansson |
| 2,548,563 A | 4/1951 | Smith |

(Continued)

FOREIGN PATENT DOCUMENTS

| CN | 1842381 A | 10/2006 |
| CN | 101028637 A | 9/2007 |

(Continued)

OTHER PUBLICATIONS

Bullens, Denison K., *Steel and its Heat Treatment*, c. 1918, John Wiley and Sons, Inc., Second Edition, pp. 210-250.

*Primary Examiner* — J. Allen Shriver, II
*Assistant Examiner* — Travis Coolman
(74) *Attorney, Agent, or Firm* — Morgan, Lewis & Bockius LLP

(57) ABSTRACT

The present invention relates to a tail trim assembly of an exhaust pipe for a vehicle of which shape is simplified to reduce the number of portions and process is changed to simplify processes so that manufacturing cost is reduced and productivity and quality are improved, and a method of manufacturing the tail trim. According to the present invention, a tail trim of an exhaust pipe for a vehicle includes a first tail trim portion of which one end is attached to an exhaust pipe at the rear portion of a vehicle, and a second tail trim portion that has an inner diameter increased in a streamlined shape toward the outside and is integrally formed with the other end of the first tail trim portion.

5 Claims, 7 Drawing Sheets

(51) Int. Cl.
*F01N 13/18* (2010.01)
*F01N 13/20* (2010.01)

(56) References Cited

U.S. PATENT DOCUMENTS

| | | |
|---|---|---|
| 3,788,417 A | 1/1974 | Willis |
| 3,857,458 A | 12/1974 | Ohtani et al. |
| 4,696,368 A | 9/1987 | Hummel et al. |
| 6,510,920 B1 | 1/2003 | Durand |
| 7,007,720 B1 | 3/2006 | Chase et al. |
| 7,086,224 B1 | 8/2006 | Perry |
| D534,111 S | 12/2006 | Wannamaker |
| 7,316,109 B2 | 1/2008 | Clerc et al. |
| D574,309 S | 8/2008 | Unfried et al. |
| 7,604,092 B2 | 10/2009 | Fritz |
| D617,705 S | 6/2010 | Cunningham |
| 2005/0167191 A1 | 8/2005 | Miller |
| 2007/0012036 A1 | 1/2007 | Perry |
| 2008/0093160 A1 | 4/2008 | Fritz |

FOREIGN PATENT DOCUMENTS

| | | |
|---|---|---|
| JP | 2000-45767 A | 2/2000 |
| JP | 2000-153314 A | 6/2000 |
| JP | 2003-041934 A | 2/2003 |
| JP | 2003-049247 A | 2/2003 |
| JP | 3721808 B2 | 9/2005 |
| JP | 2005-296969 A | 10/2005 |
| JP | 2006-043738 A | 2/2006 |
| JP | 2006-200500 A | 8/2006 |
| KR | 2000-0015297 A | 3/2000 |
| KR | 10-0559059 B1 | 3/2006 |

TAIL TRIM ASSEMBLY OF EXHAUST PIPE FOR VEHICLE AND METHOD OF MANUFACTURING THE SAME

CROSS-REFERENCE TO RELATED APPLICATION

The present application is a Divisional application of U.S. patent application Ser. No. 12/274,208, filed Nov. 19, 2008, which claims priority to Korean Application Number 10-2008-0039857, filed on Apr. 29, 2008, the entire contents of which applications are incorporated herein for all purposes by this reference.

BACKGROUND OF THE INVENTION

1. Field of the Invention

The present invention relates to a tail trim assembly of an exhaust pipe for a vehicle and a method of manufacturing the tail trim, and more particularly, to a tail trim assembly of an exhaust pipe for a vehicle of which shape is simplified to reduce the number of components and process is simplified so that manufacturing cost is reduced and productivity and quality are improved and to a method of manufacturing the tail trim.

2. Description of Related Art

As shown in FIG. 1, in a tail trim assembly of an exhaust pipe for a vehicle, a tail trim 120, which has an inner diameter D2 increased to be larger than inner diameter D1 of an exhaust pipe 110 toward the outside, is attached to exhaust pipe 110 at the rear portion of a vehicle. Tail trim 120 is made of stainless steel, makes the outer appearance of the rear portion of the vehicle better, and has an inner diameter D2, which is larger than inner diameter D1 of exhaust pipe 110, toward the outside. Therefore, the tail trim decreases the discharge speed of exhaust gas that is discharged through exhaust pipe 110, and prevents a pedestrian from being hurt by heat generated when exhaust gas is discharged therethrough.

Further, first and second brackets 130a and 130b are provided between exhaust pipe 110 and tail trim 120 so as to ensure a sealed space, so that a space is formed between exhaust pipe 110 and tail trim 120. Accordingly, when exhaust gas is discharged, discharge speed reducing performance is further satisfied.

However, as shown in FIG. 2, first bracket 130a forms a step A between exhaust pipe 110 and tail trim 120. Accordingly, when a vehicle moves in a direction indicated by an arrow "a", noise is caused by running wind.

Meanwhile, since tail trim 120 for a vehicle is to make the outer appearance of the rear portion of the vehicle better, coating is formed on second bracket 130b. However, there is a problem in that the coating is removed due to the heat of exhaust gas as shown in FIG. 3. The problem that the coating is removed due to the heat of the exhaust gas may be prevented by changing a coating material, which causes manufacturing cost to be increased.

In addition, referring to FIG. 4, the tail trim assembly of the exhaust pipe for a vehicle in the related art is formed as follows: exhaust pipe 110, first and second brackets 130a and 130b, and tail trim 120 are formed by pressing, bending, and cutting processes respectively, and then first and second brackets 130a and 130b are attached to exhaust pipe 110 by performing welding twice. Tail trim 120 is attached to exhaust pipe 110, on which first and second brackets 130a and 130b are mounted, by performing welding respectively. After that, a coating is formed on second bracket 130b. As described above, a method of manufacturing the tail trim assembly of the exhaust pipe for a vehicle in the related art has a problem in that several times of pressing processes and welding processes are required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a simplified tail trim assembly of an exhaust pipe for a vehicle having reduced manufacturing cost. Various aspects of the present invention are directed to an improved tail trim assembly having a simplified shape such that productivity and quality are improved.

In various embodiments, a tail trim of an exhaust pipe for a vehicle includes a first tail trim portion, one end of which is attached to a rear end of an exhaust pipe; and a second tail trim portion integrally formed with an opposite end of the first tail trim portion from the exhaust.

The second tail trim portion may have an inner diameter substantially increasing in a streamlined shape toward an outside of the exhaust. A maximum inner diameter of the second tail trim portion may be larger than a maximum inner diameter of the first tail trim portion.

In various embodiments, the tail trim further includes a carbonized film formed along an inner surface of the first and second tail trim portions.

The first and second tail trim portions may be monolithically formed.

The exhaust pipe, the first tail trim portion, and the second tail part may be substantially coaxial.

Various aspects of the present invention are directed to an exhaust system for a vehicle comprising a tail trim in accordance with the various embodiments. Various aspects of the present invention are directed to a passenger vehicle including the exhaust.

Various aspects of the present invention are directed to a method of manufacturing a tail trim of an exhaust pipe for a vehicle. The method includes forming a substantially tubular pipe section by a pipe forming process; forming a first tail trim assembly along the pipe section by a hydroforming process for injecting fluid into the pipe section at high pressure, the first tail assembly including first and second tail trim portions; performing a heat treatment process in the first tail trim assembly; forming a second tail trim assembly by a hydroforming process for injecting fluid into the tail trim assembly at high pressure; and finishing the tail trim assemblies. The finish may include performing at least one of cutting, deburring, and restriking to the first and/or second tail trim assembly.

The second tail trim may be formed so that an inner diameter of the second tail trim part substantially increases in a streamlined shape toward an outside of the exhaust. The performing of the heat treatment process may include forming a carbonized film along an inner surface of the first and second tail trim portions of the first tail trim assembly.

In various embodiments, the method further includes repeating a heat treatment process in the second tail trim assembly; and hydroforming by injecting fluid into one of the first tail trim assembly, second tail trim assembly, and pipe section at high pressure one or more times.

In the hydroforming of the first and second trail trim portions, the first and second tail trim portions may be formed so that inner diameters of the first and second tail trim portions substantially increase in a streamlined shape toward the pipe section.

In various embodiments, the method further includes repeating a second heat treatment process and a third hydroforming process for injecting fluid into the secondarily formed pipe at high pressure after the second hydroforming process.

Various aspects of the present invention are directed to a tail trim assembly of an exhaust pipe for a vehicle including a first tail trim portion, one end of which is attached to a rear end of the exhaust pipe; and a second tail trim portion formed at an opposite end of the first tail trim portion and extending outwards in a longitudinal direction. The inner diameters of the first and second trail trim portions may substantially continuously increase moving in the longitudinal direction toward the outside of the exhaust and trim assembly.

An inner diameter of the first tail trim portion adjacent the exhaust pipe may be smaller than an inner diameter of the second tail trim portion at the opposite end. An inner diameter of the first tail trim portion formed at the other end thereof may be larger than an inner diameter of the exhaust pipe.

The first tail trim portion may extend from the rear end of the exhaust pipe such that an outer surface of the first tail trim portion has a substantially concave shape.

The second tail trim portion may extend from the opposite end of the first tail trim portion such that an outer surface of the second tail trim portion has a substantially convex shape.

The tail trim assembly may further include a carbonized film formed along an inner surface of the first and second tail trim portions.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 5:
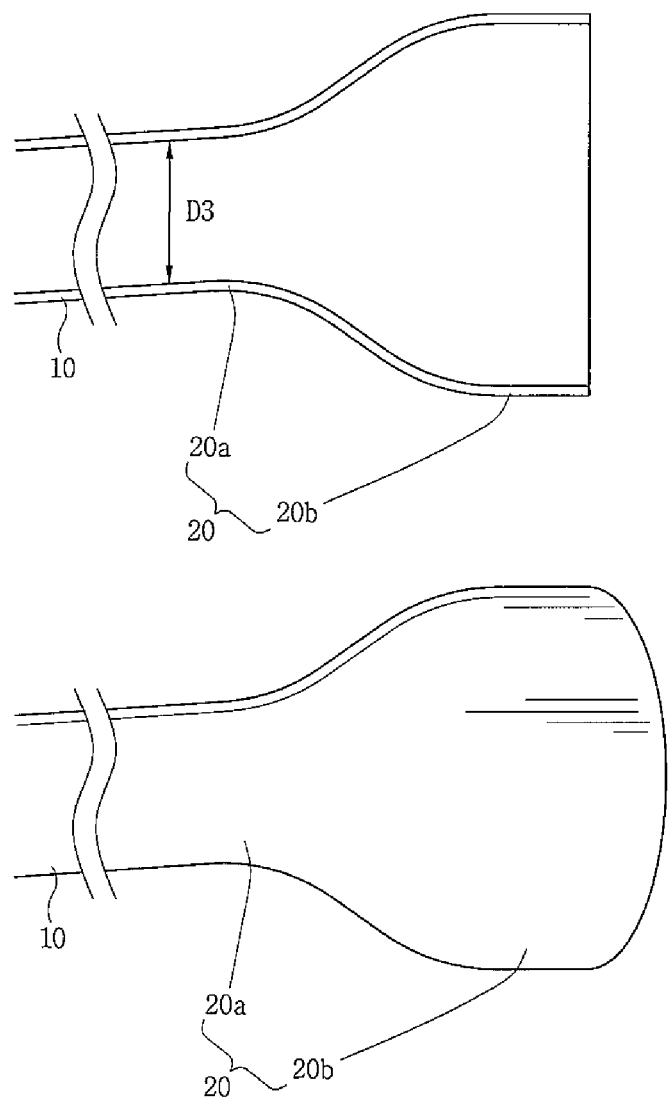
FIG. 5 is a view showing a tail trim assembly of an exemplary exhaust pipe for a vehicle according to the present invention.

Referring to FIG. 5, a tail trim 20 of an exhaust pipe for a vehicle according to the present invention includes a first tail trim portion 20a, one end of which is attached to a rear portion of an exhaust pipe 10 at a vehicle; and a second tail trim portion 20b that has an inner diameter increased in a streamlined shape toward the outside so as to be larger than an inner diameter D3 of first tail trim portion 20a, and is integrally formed with first tail trim portion 20a at the other end of first tail trim portion 20a. In an exemplary embodiment, the exhaust pipe 10, the first tail trim portion 20a, and the second tail trim portion 20b may be co-axially aligned in a sequential order.

The streamlined structure of first tail trim portion 20a and second tail trim portion 20b is configured to be contoured to reduce resistance to motion of exhaust gas therethrough. By "streamlined" it is meant that the structure is smoothed and reduces turbulent flow along the surface. For example, sharp corners are generally avoided. Accordingly, one will appreciate that various shapes may be applied such as cone or combination of a variety of convex and/or concave structure in various embodiments of the present invention to reduce resistance to motion of exhaust gas therethrough or along an outer surface.

Tail trim 20 of the exhaust pipe for the vehicle according to the exemplary embodiment of the present invention may be formed by a hydroforming process.

The hydroforming process is a process that requires a hollow tube placed inside a negative mold that has the shape of the desired end result. After that process, high pressure hydraulic pistons then inject a fluid at very high pressure inside the hollow tube which causes it to expand until it matches the mold.

Figure 6:
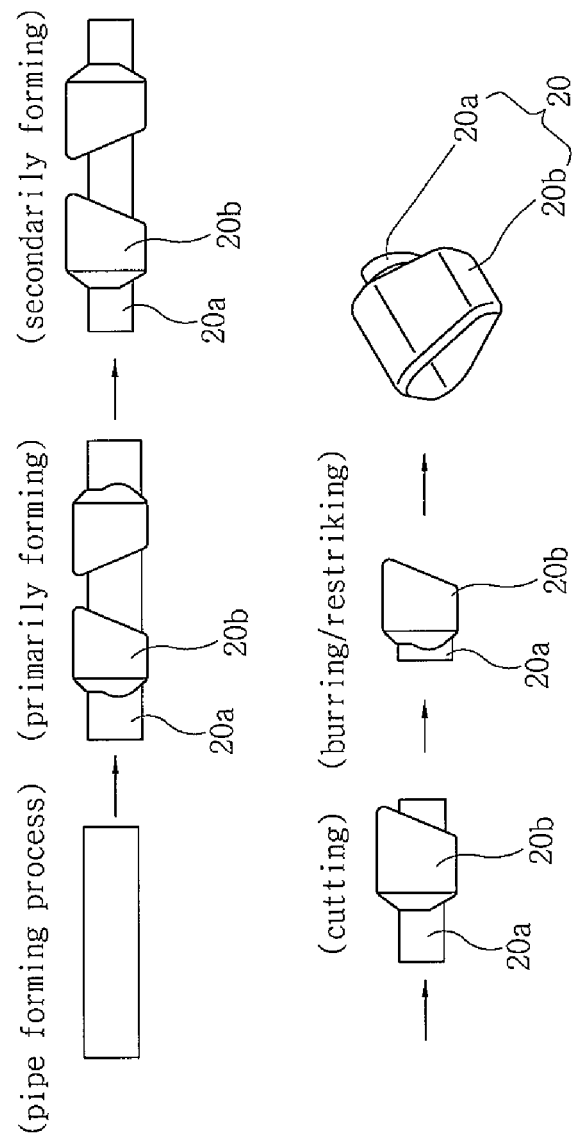
FIG. 6 is a view illustrating an exemplary method of manufacturing a tail trim assembly similar to that of FIG. 5 in accordance with the present invention.
Figure 7:
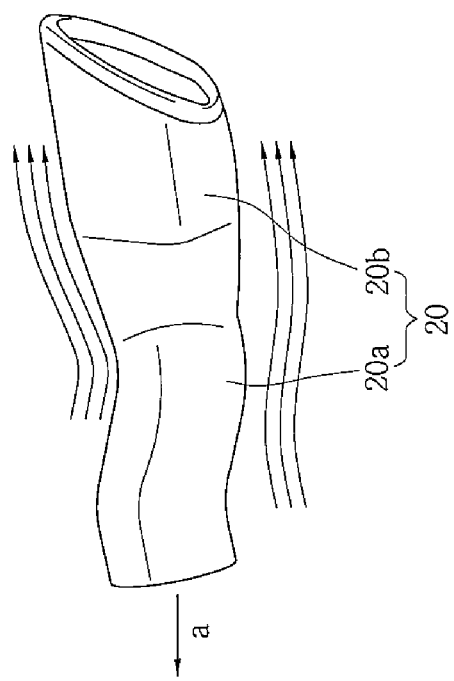
FIG. 7 is a view illustrating a noise reduction effect obtained from running wind in an exemplary exhaust pipe similar to that of FIG. 5.

Referring to FIG. 6, a method of manufacturing the tail trim of the exhaust pipe for the vehicle according to the present invention includes a pipe-forming process to form a tubular pipe, and primarily to form first and second tail trim portions 20a and 20b by injecting fluid into the formed tubular pipe at high pressure. However, there may be a limit to the streamlined increase of the inner diameter of second tail trim portion 20b in a streamlined shape when first and second tail trim portions 20a and 20b are formed only by the primary hydroforming process above.

Accordingly, the method may include an additional process to remove internal stress of the primarily formed pipe by performing a heat treatment process in primarily formed first and second trim portions 20a and 20b, and then secondarily, to form first and second trim portions 20a and 20b by injecting again fluid into first and second trim portions 20a and 20b, from which stress is removed, at high pressure. If the inner diameter of second tail trim portion 20b formed by the secondary hydroforming process is sufficiently increased in a streamlined shape and the discharge speed of exhaust gas discharged through exhaust pipe 10 is thus decreased, the method of manufacturing the tail trim of the exhaust pipe for a vehicle forms tail trim 20 by a cutting process, a deburring process, and/or a restriking process. One end of first tail trim portion 20a of formed tail trim 20 is attached to exhaust pipe 10 by welding.

With reference to FIG. 6, tail trim 20 has been formed by the two hydroforming processes. However, the method of manufacturing the tail trim of the exhaust pipe for a vehicle according to the present invention is not limited to two hydroforming processes. The manufacturing process may include performing two or more processes to increase the inner diameter of second tail trim portion 20b so as to be enough to decrease the discharge speed of the exhaust gas discharged through exhaust pipe 10.

As described above, tail trim 20 includes first and second tail trim portions 20a and 20b that are formed by a hydroforming process and are integrally formed with each other. Further, second tail trim portion 20b, which is integrally formed with first tail trim portion 20a, has an inner diameter that is in a streamlined shape increased from first tail trim portion 20a toward the outside by two or more hydroforming processes. By "outside" it is meant a rearward end of the exhaust, which is behind the vehicle when the trim assembly extends from a rear end of the vehicle. Alternatively, in other configurations, such as when the exhaust extends from sides of the vehicle, "toward the outside" refers to a direction away from the body of the vehicle and toward an area outside the vehicle body where the exhaust gas is ultimately released.

Figure 1:
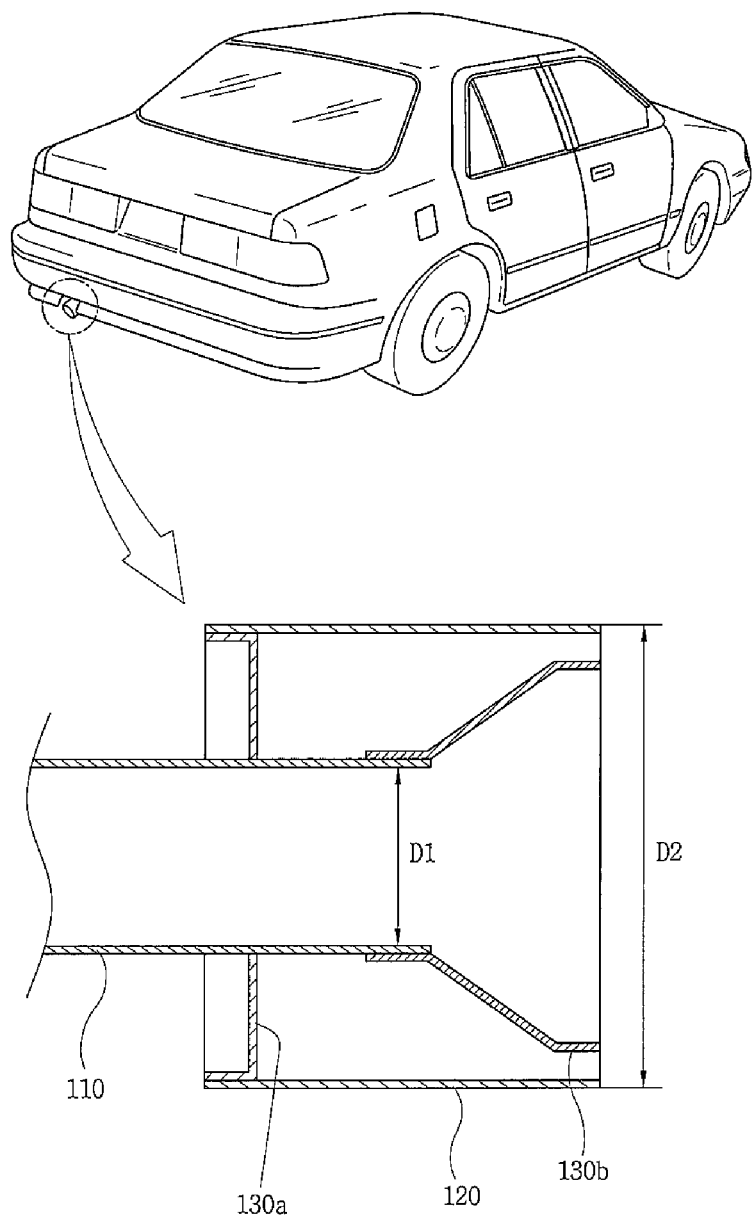
FIG. 1 is a view showing a tail trim assembly of an exhaust pipe for a vehicle in the related art.

As described above, tail trim 20 according to the exemplary embodiment of the present invention includes first and second tail trim portions 20a and 20b that are formed by the hydroforming process and integrally formed with each other. Second tail trim portion 20b, which is integrally formed with first tail trim portion 20a, has an inner diameter increased in a streamlined shape toward the outside from first tail trim portion 20a. Accordingly, first and second brackets 130a and 130b (see FIG. 1) of the tail trim assembly of the exhaust pipe for a vehicle in the related art may be removed from tail trim 20 formed according to the exemplary embodiment of the present invention.

Further, one end of formed first tail trim portion 20a of tail trim 20 of the exhaust pipe is attached to exhaust pipe 10 by welding, so that it is possible to remove exhaust pipe 110 (e.g. FIG. 1) extending from the tail trim assembly of the exhaust pipe for a vehicle in the related art to the inside of tail trim 120. Therefore, the shape of tail trim 20 of the exhaust pipe for the vehicle according to the present invention is simplified so that it is possible to reduce manufacturing cost and the weight thereof thereby improving the fuel efficiency.

Further, in tail trim 20 of the exhaust pipe for the vehicle according to the exemplary embodiment of the present invention, since first and second tail trim portions 20a and 20b are integrally formed with each other by the hydroforming processes, first and second brackets 130a and 130b included in the tail trim assembly of the exhaust pipe for a vehicle in the related art may be removed. Therefore, when tail trim 20 is manufactured, a plurality of welding processes may be eliminated. As a result, the method of manufacturing the exhaust pipe for the vehicle according to the present invention simplifies processes, thereby reducing manufacturing cost, improving quality, and improving productivity.

Meanwhile, the method of manufacturing the tail trim of the exhaust pipe for the vehicle according to the present invention performs a heat treatment process in first and second trim portions 20a and 20b that are formed by the primary hydroforming process, thereby removing internal stress of the primarily formed pipe. In this heat treatment process, a carbonized film is formed on the inner surfaces of first and second trim portions 20a and 20b together.

Accordingly, since a coating process may be removed, it is possible to further simplify processes, to further reduce manufacturing cost, and to further improve productivity. Since the carbonized film further resists heat as compared to the conventional coating processes, it is possible to improve quality.

In addition, since second tail trim portion 20b of the present invention has an inner diameter that is increased in a streamlined shape from first tail trim portion 20a toward the outside, a first bracket 130a included in the tail trim assembly of the exhaust pipe for a vehicle in the related art may be removed from tail trim 20.

Figure 2:
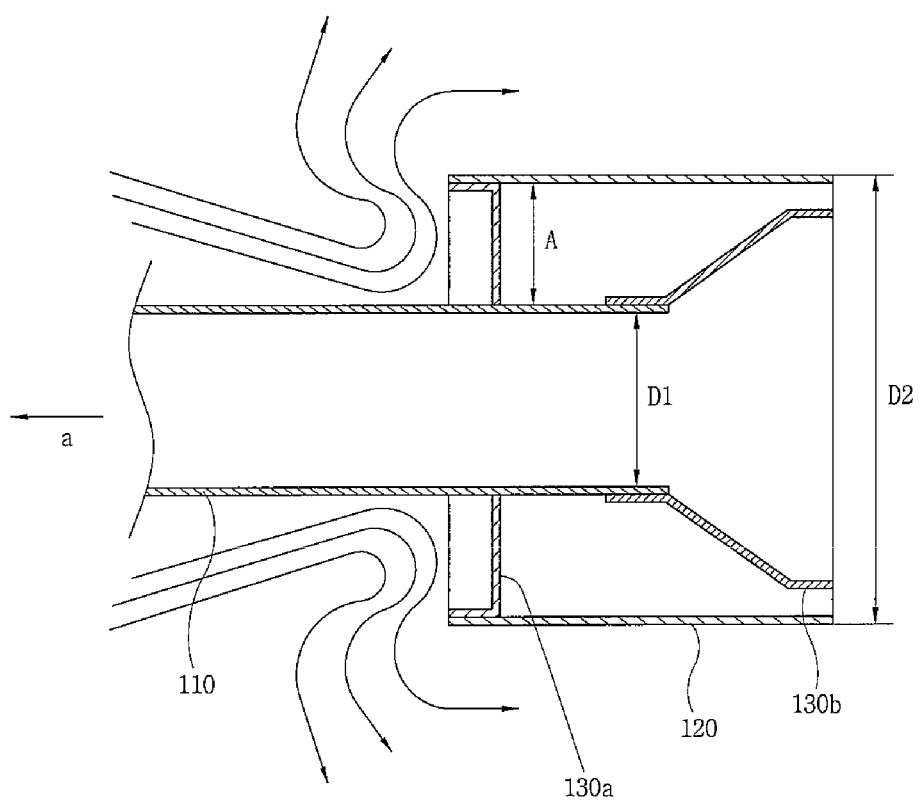
FIG. 2 is a view illustrating noise generated in a mounting region of a bracket in the related art.
Figure 3:
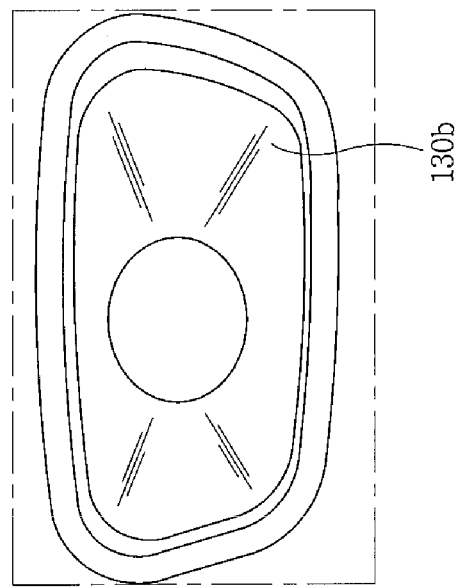
FIG. 3 is a view showing an example where a coating of the tail trim assembly of the exhaust pipe for a vehicle in the related art is removed.
Figure 4:
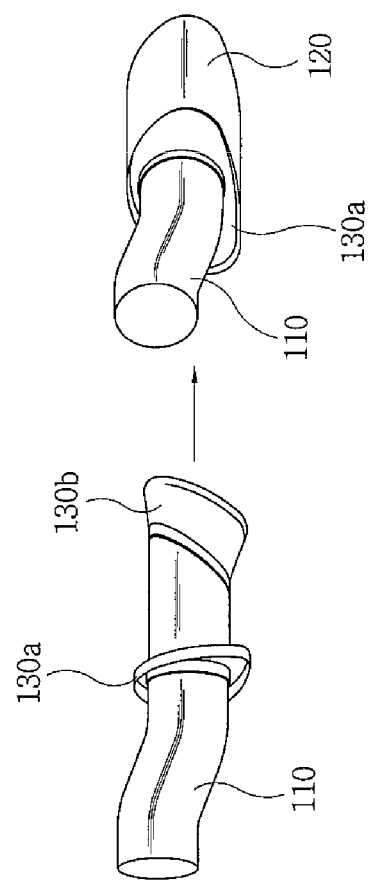
FIG. 4 is a view illustrating a process for the tail trim assembly of the exhaust pipe for the vehicle in the related art.

Since first bracket 130a is removed, a step A (see FIG. 2) having been formed in the tail trim assembly of the exhaust pipe for a vehicle in the related art may also be removed. Accordingly, the tail trim of the exhaust pipe for a vehicle according to the present invention can reduce noise caused by running wind. Further, since second tail trim portion 20b has an inner diameter that is increased in a streamlined shape from first tail trim portion 20a toward the outside, the volume of the trim is increased. Therefore, exhaust gas is easily discharged. As a result, discharge noise of the exhaust gas may also be reduced.

For convenience in explanation and accurate definition in the appended claims, the terms "upper" or "lower", "front" or "rear", "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of manufacturing a tail trim of an exhaust pipe for a vehicle, the method comprising:
    forming a substantially tubular pipe section by a pipe forming process;
    forming a first tail trim assembly along the pipe section by a primary hydroforming process by injecting fluid into the pipe section at high pressure, the first tail assembly including first and second tail trim portions;
    performing a heat treatment process in the first tail trim assembly, wherein the performing of the heat treatment process includes forming a carbonized film along an inner surface of the first and second tail trim portions of the first tail trim assembly;
    forming a second tail trim assembly by a secondary hydroforming process by injecting fluid into the first tail trim assembly at high pressure; and
    performing at least one of cutting, deburring, and restriking to the second tail trim assembly.

2. The method as defined in claim 1, wherein in the forming of the second tail trim assembly, the second tail trim assembly is formed so that an inner diameter of the second tail trim portion substantially increases in a streamlined shape toward an outside.

3. The method as defined in claim 1, further comprising:
    repeating a heat treatment process in the second tail trim assembly; and
    hydroforming by injecting fluid into one of the first tail trim assembly, second tail trim assembly, and pipe section at high pressure one or more times.

4. The method as defined in claim 1, wherein in the hydroforming of the first and second trail trim portions, the first and second tail trim portions are formed so that inner diameters of the first and second tail trim portions substantially increase in a streamlined shape toward an outside.

5. The method as defined in claim 1, further comprising:
repeating a second heat treatment process and a third hydroforming process by injecting fluid into the second tail trim assembly at high pressure after the secondary hydroforming process.

\* \* \* \* \*